Aug. 20, 1963 J. C. BAXTER 3,101,158
CONVEYOR AND A CASE RELEASE APPARATUS
Filed June 6, 1960

INVENTOR
JOHN C. BAXTER

ATTORNEYS

United States Patent Office 3,101,158
Patented Aug. 20, 1963

3,101,158
CONVEYOR AND A CASE RELEASE
APPARATUS
John C. Baxter, Grand Rapids, Mich., assignor to The
Rapids-Standard Company, Inc., Grand Rapids, Mich.,
a corporation of Michigan
Filed June 6, 1960, Ser. No. 34,109
5 Claims. (Cl. 221—295)

This invention relates to a case release for controlling the discharge of packages or cases and more particularly to regulating the discharge of cases from the end of a live storage rack.

Live storage racks or conveyors are of the type which are installed in warehouses and are utilized for storage of various commodities. The live storage racks are mounted at an angle so that articles stored thereupon will move under their own force of gravity if the terminal ends of the storage racks are open. Thus it is necessary to provide some type of stop at the end of the storage racks to prevent movement of the stored articles. Often this stop means is in the form of a release which can be actuated to allow one of the cases or packages to move from the storage rack onto another conveyor or onto a lift truck. Such releases usually prevent the following case from being discharged until the release is again actuated.

Present releases of this type require the momentum or forward movement of the package or case to carry itself over the release. This creates a gap so that some type of stop means may interrupt the following case. This often results in malfunctioning since the case will pass a partial distance over the release and then hang up thereon. The energy of forward movement of the article will be dissipated in raising the article over the release thus causing the hang up. This results in the article coming to a stop on the release so that the release is neither discharged nor resettable. A workman is then required to remove the article from the rack. This is particularly undesirable in a large warehouse where the release and control of such packages may be directed remotely. Thus such malfunctions may result in the consumption of many unnecessary man-hours.

Present release mechanisms will also malfunction in that they often allow two cases or packages to pass upon one actuation of the release. This also is a particularly undesirable feature if the release is being controlled remotely. Thus, if two cases are released and conveyed to a loading dock erroneously, delivery of two cases will be made instead of one. This may result in poor customer relations or may result in the loss of the case of goods which may never be accounted for. Thus, it is important to have a case release which positively prevents passage of more than one case upon each actuation thereof.

The present invention is designed to overcome the above disadvantages.

Malfunction by hang up on the release will never occur in the device of this invention since the momentum of the forward movement of the case is not relied upon to carry the case over the release in the sense that the case is raised by forward movement to create a gap. In the present invention, the case moves forward in the same plane as the plane of the rotating conveyor members which form a part of the live storage racks. Thus, there is nothing to impede the forward movement of the case. When the case has moved forwardly to a position so that its center of gravity is beyond the axis of rotation of the release member, the downward force of gravity will cause rotation of the release member and thus fully release the case. Release is then caused by the force of gravity acting downwardly rather than the momentum of the case moving forwardly.

It is an object of this invention to provide a case release wherein it is not necessary to use the forward momentum of the article to create a break or gap between the cases so that the next following article can be positively intercepted.

Still another object of this invention is to provide a case release where the forward momentum of the article is not relied upon to raise the article and carry it over the release.

Another object of this invention is to provide a release wherein the article may be returned to the storage rack over the release without lifting.

Still another object of this invention is to provide a release which may be controlled manually or automatically.

It is an object of this invention to provide a combination release and warning system wherein a remote control operator may be informed of an empty storage rack.

Still another object of this invention is to provide a release which is simple in design, simple to manufacture and simple to install.

These and other objects and advantages of this invention will become more apparent upon reading the following specification in conjunction with the accompanying drawings, wherein.

This invention relates basically to a release for controlling the movement of cases from a live storage rack. The release is connected to the terminal end of a live storage rack and is rotatably mounted on the terminal shaft of the conveyor. The release member is of triangular shape and is rotatable so that an apex thereof projects above the plane of the rotating elements of the conveyor thus limiting movement of a case on the conveyor. A side of the release member is maintained in the case stopping position by a trip lever which is pivotally mounted to support mechanism secured to the live storage rack conveyor mechanism.

The trip lever can be moved out of the path of rotation of the release member to allow the foremost one of the gravity-fed cases on the live storage rack to rotate the release member. The side of the release member that previously acted as the stop then rotates into a position parallel to the conveyor surface and acts as a support to carry the case. As the case moves forwardly its center of gravity passes over the axis of rotation of the release member, and causes rotation of the release member to bring the next side thereof into case interrupting position. As the last mentioned rotation takes place, the trip lever moves back into position limiting rotation of the release member to a point where the newly positioned side interrupts movement of the case.

A switch means cooperates with the trip lever and is operated by the force of a case applied to the release member and transmitted thereby to the switch. This force is sufficient to overcome the bias of a spring and cause actuation of the switch. If a storage rack is out of cases, the spring will de-energize the switch and cause an indicator to function at a remote point.

Figure 1:
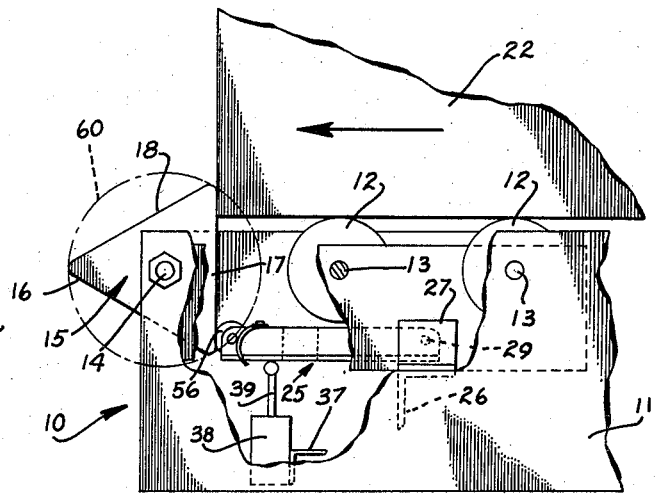
FIG. 1 is a side elevational view of the case release.

FIG. 1 shows the case release assembly 10. The assembly includes a release member 15 which is secured to a conveyor mechanism, a trip lever 25, a roller actuator 40 which cooperates with a spring 45, and a microswitch 55.

Figure 5:
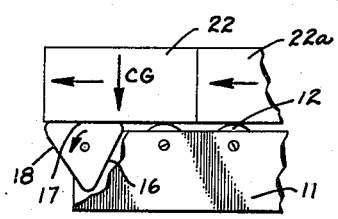

The case release assembly 10 is operative in an environment of live storage rack conveyor mechanism. This conveyor mechanism is shown briefly in FIG. 1. A conveyor side rail 11 supports conveyor roller shafts 13 at equally spaced intervals therealong. A similar side rail (not shown) supports the opposite end of the conveyor roller shafts 13. Conveyor rollers 12 are journaled on the shafts 13 and are adapted to support the cases or packages stored on the live roller storage racks. The conveyer side rails are inclined so that cases such as 22 and 22a, as shown in FIG. 5, move in the direction of the arrows. This movement is due to the force of gravity acting upon the cases. Thus the cases are gravity fed from the live storage racks.

Figure 2:
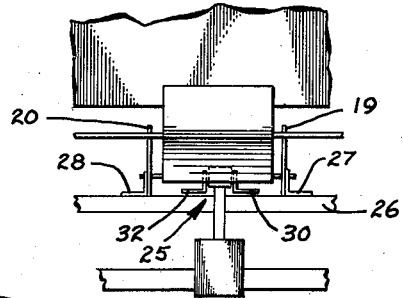
FIG. 2 is an end elevational view of the case release.

The release member 15 is located at the lowest end of the live storage rack. A release shaft 14 is supported on the side rails 11 and is aligned with the conveyor roller shafts 13. If a conveyor roller, such as 12, has previously occupied this position, the conveyor roller may be removed and the shaft used to support the release member 15. The release member 15 is rotatably journaled upon the shaft 14 and is positioned centrally between the side rails 11 by plate members 19 and 20 (FIG. 2) secured to a cross brace 26 fixed to rails 11 in a conventional maner. The plate members 19 and 20 maintain the release member in alignment with the trip lever 25.

The release member 15 is an equilateral triangular member having equal sides 16, 17 and 18. The release member 15 is preferably constructed of some light metal or is shell-like so that it is easily rotatable by the cases stored on the live storage racks. However, the release member 15 must be strong enough to support the cases on the sides thereof in a manner which will be explained more fully subsequently.

The sides 16, 17 and 18 of the release member 15 are of sufficient length so that when the release member 15 assumes the FIG. 1 or stop position, a portion of the side will extend above the level of the conveyor rollers 12. This extending portion of the side operates as the stop surface for the case stored on the live storage rack. As seen in FIG. 1, the release member 15 rotates in a counterclockwise direction. Rotation of the release member 15 is limited to 240 degree intervals by the operation of the trip lever 25, now to be described.

The trip lever 25 is supported by mechanism secured to the side rails 11. The angle-shaped cross brace 26 extends between the side rails 11 and is secured thereto by conventional fastening such as welding. Angle brackets 27 and 28 are secured by proper means to the cross brace 26 and maintain the plates 19 and 20 in upright position. These members are spaced sufficiently to allow operation of the trip lever 25 therebetween. The trip lever 25 is pivotally mounted on a shaft 29 which extends transversely betwen the plates 20 and 21, and the angle brackets 27 and 28, and is supported thereby.

The trip lever 25 consists of a pair of arms 30 and 32 having flanges 31 and 34 formed integral therewith and projecting transversely upwardly therefrom. The flanges 31 and 34 are journaled on the shaft 29. Elongated slots 35 and 36 are formed respectively in the flanges 31 and 34 and assume a position parallel to that of the arms 30 and 32.

The slots 35 and 36 accommodate a shaft 41 of a roller actuator 40. The roller actuator 40 is movable longitudinally with respect to the flanges 31 and 34 a distance determined by the length of the slots 35 and 36.

Figure 3:
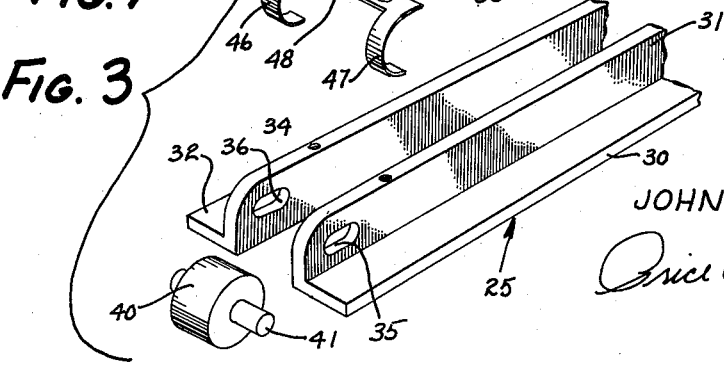
FIG. 3 is a perspective view of the trip lever showing the switch means associated therewith in exploded position.

A spring 45 has a plate portion 48 which is secured to the upper edges of flanges 31 and 34 by appropriate fasterners 50. Spaced curvilinear fingers 46 and 47 are formed integral with the plate 48 and are positioned so as to engage the roller actuator shaft 41 and force it to the left-hand end of the trip lever 25 as shown in FIG. 3. The shaft 41 is of sufficient length so as to project beyond the outside faces of the flanges 31 and 34 and be engaged by the spring fingers 46 and 47.

The microswitch 55 is sandwiched between the flanges 31 and 34 and secured thereto. The microswitch 55 has an actuator arm 57 and actuator wheel 56. The microswitch 55 and its components are located along the longitudinal extent of the trip lever 25 so that the switch is not actuated by the actuator roller 40 when the spring fingers 46 and 47 urge the actuator roller 40 to the left-hand position of the slots 35 and 36, as shown in FIG. 3. The microswitch 55 is actuated by the force of a case being transmitted through the release member 15 to overcome the pressure of the springs 46 and 47 and move the roller actuator 40 against the actuator wheel 56 to actuate the switch. This will be explained more fully under "Operation."

As shown in FIG. 1, the trip lever 25 is pivotally mounted on the angle brackets 27 and 28 so that when in the stop position (FIG. 1) the contact roller 40 engages the side 17 of release member 15. When the trip lever 25 is in the FIG. 1 position, or stop position, the release member 15 cannot rotate in the counterclockwise direction. The release member 15 will not attempt to rotate clockwise since the case is abutting the stop surface of the side 17.

A solenoid 38 is attached to a cross beam 37 which is supported by the side rails 11. The solenoid 38 has an actuator 39 which is secured to the trip liver 25. Upon actuation of the solenoid 38, the trip lever is moved downwardly into the release position by pivoting the lever 25 about the shaft 29. The roller actuator 40 is then moved out of engagement with the lower surface or trip lever engaging surface of side 17 and the release member 15 can rotate free of the trip lever 25. The release member 15 is rotated by a gravity-fed case on the live storage rack. Rotation of the release member 15 is limited to 240 degrees, since the trip lever 25 will move to the stop position by means of a spring (not shown) or a reverse acting solenoid (not shown) to stop rotation thereof. Although the trip lever has been described as being solenoid operated, it is to be understood that the trip lever 25 is equally adapted to manual operation.

*Operation*

The operation of the release assembly 10 is described in conjunction with a live storage conveyor with which it is primarily designed for use. However, it is to be understood that it is equally adaptable for use with a power operated or other type of conveyor.

In describing the operation, it is assumed that at least two cases are in storage on the conveyor roller 12 of the live storage conveyor track. If the release is remotely controlled, the operator will connect an electrical circuit to energize the solenoid 38 which will move the trip lever 25 to the release position. If the release is manually operated, an operator will engage the trip lever 25 and pull it downwardly out of the path of rotation of the release member 15.

Figure 4:
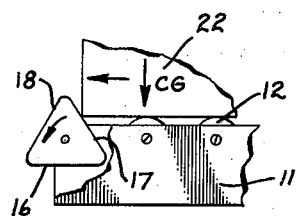
FIGS. 4–7 are side elevational views showing the progressive movement of the case as it passes over the release.
Figure 6:
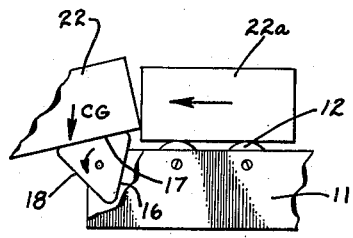
Figure 7:
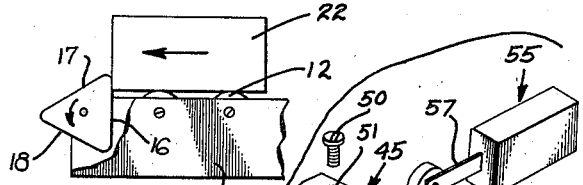

FIGS. 1 and 4 through 7 show the progressive movement of the case from its initial position to its fully released position. Thus, FIG. 1 shows the case 22 in the stopped position and the position it assumes immediately after release of trip lever 25. FIG. 4 shows initial rotation of the release member 15, the trip lever engaging portion of side 17 having passed beyond the roller actuator 40 of trip lever 25. FIG. 5 shows the release member 15 rotated into the position where the side 17 thereof is fully supporting the case 22. It should be noted that the release member 15 in traveling from the FIG. 4 position to the FIG. 5 position has not had to raise itself under the inertia of its forward movement since the side 17 of release member 15 has always remained below or at a level with the plane of the conveyor roller 12 upon which the case is riding. FIG. 6 shows the case 22 having moved to a position wherein the center of gravity (CG) thereof has moved over the axis of rotation of the release member 15 and is applying the center of gravity of the box to a point near the apex of the release member caused by the junction of the sides 17 and 18. This force is sufficiently great to cause rotation of the case 22 and the trailing edge thereof to ride up the leading edge of the following case 22a. Notice that the stop surface portion of side 16 is already in position to interrupt the following case 22a. Thus, the stop surface portion of side 16 is already in positive stopping position. During the interval of rotation of stop member 15 shown between FIGS. 4 through 6, the trip lever 25 has moved back to the stop position as shown in FIG. 1. FIG. 7 shows the release member 15 as it has just come to rest against the roller actuator 40 of trip lever 25, the case 22a having moved forward against the stop surface of side 16. The trailing edge of case 22 will have only slight contact with the leading edge of case 22a in the FIG. 7 position and will continue to be gravity fed completely off the surface 17 onto another conveyor or case transporting device.

It is important to note that the trailing edge of case 22 at no time enters the arc of rotation 60 (shown in phantom in FIG. 1) generated by the rotation of the release member 15, during progression thereof through the FIGS. 4, 5 and 6 movement. Thus, the stop surface of side 16 is necessarily in position to interrupt the following case 22a before the leading edge thereof reaches the arc of rotation of the release member 15.

After a case has been released it is sometimes necessary to position it back on the live storage rack, as for example when the operator erroneously releases the wrong item of merchandise. If such is necessary, this can easily be accomplished by merely moving the case and the release member 15 in a clockwise direction and pushing the case back onto the live storage rack. It is not necessary to actually lift the case but merely move it about the release shaft axis 14. This is a desirable feature since the live storage racks are often assembled in tiers with a minimum of clearance between the tiers. If it is necessary to lift the case over the release member to restore it to the live storage rack, often the upper edges of the cases are damaged by coming in contact with the overhanging tiers. This cannot occur if the case is maintained on the release member and rotated back into position.

A case on the live storage rack will cause a force to be exerted against the stop surface of one of the sides of the release member 15 (side 17, as shown in FIG. 1). This force will tend to cause the release member to rotate in a counterclockwise direction about the release shaft 14. This force is transmitted to the release member 15 and is applied by the roller actuator 40 against the spring fingers 46 and 47 which urge the roller actuator 40 into contact with the trip lever engaging surface portion of side 17. The force applied by the case to the release member 15 and transmitted to the roller actuator 40 is sufficient to overcome the pressure of the spring fingers 46 and 47, and roller actuator 40 will engage the actuator wheel 56 of microswitch 55 and cause actuation thereof. Thus, it is apparent that as long as a case appears on the live storage rack and exerts a pressure against the release member 15 the microswitch 55 will be actuated. This can be used to complete a circuit which lights a light at a remote control station, indicating that a live storage rack is supplied with cases.

If the live storage rack supply runs out of merchandise, there is not sufficient force to overcome the spring fingers 46 and 47 and the actuator roller 40 is then not capable of actuating the microswitch 55. This will open the circuit and put out the light at the remote control station, indicating to the operator that the live storage rack needs resupplying. The circuit can be wired in the reverse manner so that the light coming on indicates that the live storage rack is out of cases and the light out indicates that it is supplied.

The invention disclosed herein provides for a case release which is very simple in design, is simple to install, and is, therefore, extremely economical to manufacture. The release is foolproof against malfunctions such as having the case hang up on the release or allowing a following case to come into position before the stop is in position. The case does not have to raise itself by the inertia of its forward movement to create a gap between it and the following case. Rather, such a gap is created by a force of gravity directed downwardly rather than forwardly. This gap is created before the trailing edge of the case moves out of the arc of rotation generated by the release member. Thus, the stop surface of the release member is positively in position before being engaged by the leading edge of the following case. The release is adaptable to automatic and manual operation and can be associated with switch means wherein the remote operator can be notified that the live storage rack is out of supplies.

While only one embodiment of this invention has been shown and described, it may be possible to practice the same through the use of certain other embodiments. These other embodiments are to be included within the spirit and scope of this invention as defined in the following claims.

I claim:

1. A case release adapted to be used with a conveyor where cases are gravity fed comprising: a conveyor; case release means adapted to be positioned at the terminus of said conveyor, said release means including a many sided release member rotatably mounted on a shaft at the end of the conveyor, each side of said release member having a portion forming a stop surface and a portion forming a trip lever engaging surface, trip lever means disposed on said conveyor and movable into and out of contact with said trip lever engaging surface; switch means associated with said trip lever means and resilient contact means engaging said trip lever engaging surface and said switch means, presence of a case on said conveyor engaging said release member and actuating said switch by overcoming said resilient contact member, said resilient contact means opening said switch if a case is absent from said conveyor, release of said trip means allowing rotation of said release member and passage of a case thereover and presenting another stop surface to a following case before the trailing edge of said first released case passes into the arc of rotation of said release member, said trip means movable to prevent further rotation of said release member.

2. A case release adapted to be used with a conveyor where cases are gravity fed comprising: a conveyor; case release means including stop surfaces positioned at the discharge end of said conveyor, trip lever means for regulation rotation of said release means, switch means actuable by said release means if a case is present on said conveyor and including means for de-actuating said switch means if a case is not present on the conveyor, said release means being rotated by a case upon release of said trip lever permitting passage of a case thereover and being so constructed that another stop surface thereof is in position to interrupt a following case before the trailing edge of said first released case has passed into the arc of rotation of said release means, said trip lever means preventing further rotation of said release means when said other stop surface is in interrupting position.

3. A case release adapted to be used with a conveyor where cases are gravity fed, as in claim 2 wherein said switch means is carried by said trip lever means and includes a spring urged actuator member, the force of a case on said conveyor applied to said release means being transferred thereby to said spring urged actuator member to overcome said spring and actuate said switch means, said spring de-actuating said switch in the absence of a force applied thereto by said release means.

4. A case release device adapted to be secured to the end of a live storage conveyor comprising: a conveyor consisting of rotatable case supporting elements mounted on shafts; release mechanism rotatably mounted on the last shaft of said conveyor; stop means including a trip lever for maintaining said release mechanism in a predetermined position, said release mechanism including an equilateral triangular shaped release member, a portion of each side of said release member side being a stop surface adapted to engage a case and another portion of each side being a trip lever engaging surface, said trip lever being pivotally mounted on a cross brace supported by said conveyor and being movable into and out of the path of the arc generated by the rotation of said release member, thereby releasing said release member or preventing rotation thereof, said release member being rotated by a case on said conveyor upon the release of said trip member and a side of said release member supporting said case, said case upon the center of gravity thereof passing over the axis of rotation of said release member tilting and thereby rotating the side adjacent the case supporting side of said release member into a position to stop the following case, said last mentioned rotation taking place before the trailing edge of said first released case has passed into the arc generated by the rotation of said release member, said trip lever movable during said last mentioned rotation to prevent further rotation of said release member.

5. A combination of a live storage conveyor and a case release comprising: conveyor means including spaced conveyor side rail supports, rotating rollers journaled on shafts supported by said side rails, said conveyor means adapted to be positioned at an angle so that cases stored thereon will be gravity fed, case release means including stop surfaces positioned at the discharge end of said conveyor means, trip lever means for regulation rotation of said release means, switch means actuable by said release means if a case is present on said conveyor means and including means for de-actuating said switch means if a case is not present on the conveyor means, said release means being rotated by a case upon release of said trip lever permitting passage of a case thereover and being so constructed that another stop surface thereof is in position to interrupt a following case before the trailing edge of said first released case has passed into the arc of rotation of said release means, said trip lever means preventing further rotation of said release means when said other stop surface is in interrupting position, said trip means including solenoid means for actuation thereof.

References Cited in the file of this patent

UNITED STATES PATENTS

| | | |
|---|---|---|
| 1,789,300 | Bihl et al. | Jan. 30, 1931 |
| 1,981,783 | De Bussey | Nov. 24, 1934 |
| 1,985,518 | Royden | Dec. 25, 1934 |
| 2,353,394 | Farmer | July 11, 1944 |
| 2,579,925 | Jackson | Dec. 25, 1951 |
| 2,738,103 | Bisese | Mar. 13, 1956 |
| 2,980,222 | Crosby | Apr. 18, 1961 |